US010152900B2

(12) United States Patent
Alejandro et al.

(10) Patent No.: US 10,152,900 B2
(45) Date of Patent: Dec. 11, 2018

(54) SYSTEM AND METHOD FOR TEACHING HOW TO WELD

(71) Applicant: Universidad de Santiago de Chile, Santiago (CL)

(72) Inventors: Gutierrez Alejandro, Santiago (CL); Guichou Jules, Santiago (CL)

(73) Assignee: Universidad de Santiago de Chile, Santiago (CL)

( * ) Notice: Subject to any disclaimer, the term of this patent is extended or adjusted under 35 U.S.C. 154(b) by 111 days.

(21) Appl. No.: 15/109,118

(22) PCT Filed: Dec. 30, 2014

(86) PCT No.: PCT/IB2014/067423
§ 371 (c)(1),
(2) Date: Jun. 29, 2016

(87) PCT Pub. No.: WO2015/101936
PCT Pub. Date: Jul. 9, 2015

(65) Prior Publication Data
US 2016/0372001 A1      Dec. 22, 2016

(30) Foreign Application Priority Data

Dec. 31, 2013   (CL) .................................. 3817-2013

(51) Int. Cl.
*G09B 19/00*   (2006.01)
*G09B 19/24*   (2006.01)
*B25J 9/16*    (2006.01)

(52) U.S. Cl.
CPC ........... *G09B 19/003* (2013.01); *G09B 19/24* (2013.01); *B25J 9/1689* (2013.01); *B25J 9/1692* (2013.01)

(58) Field of Classification Search
CPC .................................. G09B 19/24; B23K 9/10
See application file for complete search history.

(56) References Cited

U.S. PATENT DOCUMENTS 3,867,769 A    2/1975   Abrahms
5,823,785 A *  10/1998  Matherne, Jr. ......... G09B 19/24
                                                        434/234
(Continued)

FOREIGN PATENT DOCUMENTS

GB          2328192 A      2/1999
WO       2013023012 A1     2/2013
WO       2015101936 A1     7/2015

OTHER PUBLICATIONS

Fu et al. "Towards Virtualized Welding: Visualization and Monitoring of Remote Welding." 2014 IEEE International Conference on Multimedia and Expo (ICME).*

(Continued)

*Primary Examiner* — Robert J Utama
(74) *Attorney, Agent, or Firm* — Tolpin & Partners, PC; Thomas W. Tolpin (57) ABSTRACT

The present invention relates to a welding teaching system, which is formed by a six degrees of freedom platform or Stewart Platform on which the welding gun carrying the electrode is placed. The Stewart Platform is connected to communication means and automatized movements as well as processing means which allow the recording of the experimented welder's movement in order to reproduce them for a welder trainee who is in a training stage. The objective of the present invention is providing a system for teaching how to weld, composed by a Stewart Platform, a welding gun, at least a sensor, an interface, a processor, a memory, a controller and actuators. The present invention also comprises methods for capturing the movements of an experienced welder in order to teach how to weld a welder trainee in the training stage.

8 Claims, 7 Drawing Sheets

(56) References Cited

U.S. PATENT DOCUMENTS

| | | | | |
|---|---|---|---|---|
| 5,947,740 A * | 9/1999 | Kim | ................. | G09B 9/14 434/29 |
| 9,505,130 B2 * | 11/2016 | Hunt | ................. | B25J 9/1689 |
| 9,701,023 B2 * | 7/2017 | Zhang | ................. | B25J 9/1689 |
| 2005/0069839 A1 * | 3/2005 | Denne | ................. | A63F 13/08 434/29 |
| 2007/0005189 A1 * | 1/2007 | Furubo | ................. | B25J 9/1689 700/251 |
| 2008/0223165 A1 * | 9/2008 | Helmer | ................. | B25J 17/0266 74/471 R |
| 2009/0298024 A1 * | 12/2009 | Batzler | ................. | B23K 9/32 434/234 |
| 2011/0117527 A1 * | 5/2011 | Conrardy | ................. | B23K 9/0956 434/234 |
| 2012/0298640 A1 * | 11/2012 | Conrardy | ................. | B23K 37/04 219/130.01 |
| 2013/0209976 A1 * | 8/2013 | Postlethwaite | ................. | G09B 19/003 434/234 |
| 2014/0315157 A1 * | 10/2014 | Bober | ................. | G09B 9/058 434/61 |
| 2015/0298318 A1 * | 10/2015 | Wang | ................. | B25J 9/1676 700/257 |
| 2016/0260261 A1 * | 9/2016 | Hsu | ................. | G06T 19/006 |

OTHER PUBLICATIONS

Liu et al. "Predictive Control for Robot Arm Teleoperation" Industrial Electronics Society, IECON 2013—39th Annual Conference of the IEEE. Nov. 10-13, 2013.*

Ming et al. "On Teleoperation of an Arc Welding Robotic System" Proceedings of the 1996 IEEE International Conference on Robotics and Automation. Minneapolis, Minnesota—Apr. 1996.*

International Search Report, PCT/IB2014/067423, dated Mar. 18, 2015.

* cited by examiner

SYSTEM AND METHOD FOR TEACHING HOW TO WELD

TECHNICAL FIELD OF THE INVENTION

The present invention relates to a welding teaching system, which is formed by a six degrees of freedom platform or Stewart Platform on which the welding gun carrying the electrode is placed.

The Stewart Platform is connected to a communication means and automatized movements as well as to processing means which allow the recording of the experienced welder's movement in order to reproduce them for a welder trainee who is in a training stage.

BACKGROUND OF THE INVENTION

The welding procedure in the metal-mechanical industry requires experienced welders which guarantee that the welding complies with the appropriate standards in the apparatus, device or a part thereof being manufactured, formed or repaired.

However, in order to assure the quality of the welding, it is absolutely necessary that this process is carried out by an experienced welder with many years of experience.

These experienced welders are scarce and their skilled labor is expensive.

Due to that reason, it becomes completely necessary to provide some kind of method which allows training welder trainees as experienced welders in the shortest possible period of time.

In order to comply with this objective, the only way is looking for some kind of equipment which allows transferring knowledge from an experienced welder to a welder trainee currently being trained.

There have been several attempts in the state of art in order to solve the problem of training welder trainees.

Thus, for example, document JPH0497383 discloses a solution for performing a welding repeated training without companion to provide a practical skills training by means of repeated simulation of skills, having a display unit for visualizing the results.

This is achieved by means of an optical pen which is established as a welding arc generating source by means of the utilization of the rectilinear propagation of light and the practice skills training by means of the simulation for the training execution, in the supposed case that the change of a certain amount of light over a light receiving surface provides the skills for a welding trainee.

The repeated training system of skills practice is provided with a device for adjusting the control range of execution to establish a control range in a welding operation and a welding execution control unit which samples and stores the actions performed in practice, also providing the skill and then it is decided that the operation is being executed out of the specified control range in such a case.

Document U.S. Pat. No. 3,867,769 discloses an arc welding simulator for teaching welder trainees how to arc well quality welds, resulting in significant savings of time and material.

Specifically, the simulator provides immediate discriminative feedback and the capacity for concentrated practice, both learning and qualities lacking in the welding process.

Document US 2009/298024 discloses a welding training system which includes one or more welding operator device which provides positional feedback relevant to a quality weld.

The positional feedback is analyzed and, when the positional feedback is outside of a predetermined range, a signal is provided to the welding operator. In one embodiment, tactile feedback is provided in a welding gun.

Document US 2011/117527 discloses a system for training welders that includes a data generating component, a data capturing component and a data processing and visualization component. The data generating component operates in real time and derives data from an actual manually-executed weld and further includes a weld process-specific jig, a calibration block positioned on the jig, wherein the geometric configuration of the calibration block is specific to a particular type of weld joint, a weld coupon positioned on the welding process-specific jig adjacent to the calibration block, a welding gun for use by a trainee, wherein the welding gun is operative to form the weld; and at least one target mounted on the welding gun that is recognized by the data processing and visualization component for providing multidimensional position and orientation feedback to the trainee.

Document WO 2013023012 A1 discloses a system and a device for welding training. In one example, a welding training system includes a display configured to show welding features related to a training welding operation. The system also includes a training workpiece having a substantially transparent weld joint configured to be placed adjacent to the display during the training welding operation. The system includes a processing device coupled to the display and configured to provide welding data relating to the training welding operation to the display. The system also includes a training torch comprising an optical sensor. The training torch is coupled to the processing device and configured to provide the processing device with data from the optical sensor corresponding to a position of the training torch relative to the training workpiece.

The documents above mentioned disclose methods and devices for teaching how to weld, however none of them describes an apparatus which comprises a six degrees of freedom platform or Stewart platform in which the welding gun is located on the upper plate controlled by the six actuators, wherein said platform is capable of recording the movements of an experienced welder so as to later reproduce them for a welder trainee in the training stage.

Due to the aforementioned, an objective of the present invention is a system for teaching how to weld, composed by a Stewart Platform, a welding gun, at least a sensor, an interface, a processor, a memory, controllers and actuators.

The present invention has as an objective to provide a method for capturing the movements of an experienced welder in order to teach how to weld a welder trainee in the training stage.

BRIEF DESCRIPTION OF DRAWINGS

The enclosed drawings are included to provide a better understanding of the invention. They constitute one of the preferred embodiments in order to explain the principles thereof.

DESCRIPTION OF THE INVENTION

The present invention refers to a system for teaching how to weld in which the system captures the movements of a qualified welder and subsequently said movements are reproduced for a welder trainee in such a way of speeding up the learning in the handling of the welding equipment.

As shown in FIGS. 1 to 4 a Stewart platform (1) is formed by a base (2) from which six actuators emerge (3) which allow an upper platform (4) to move in six degrees of freedom.

Figure 1:
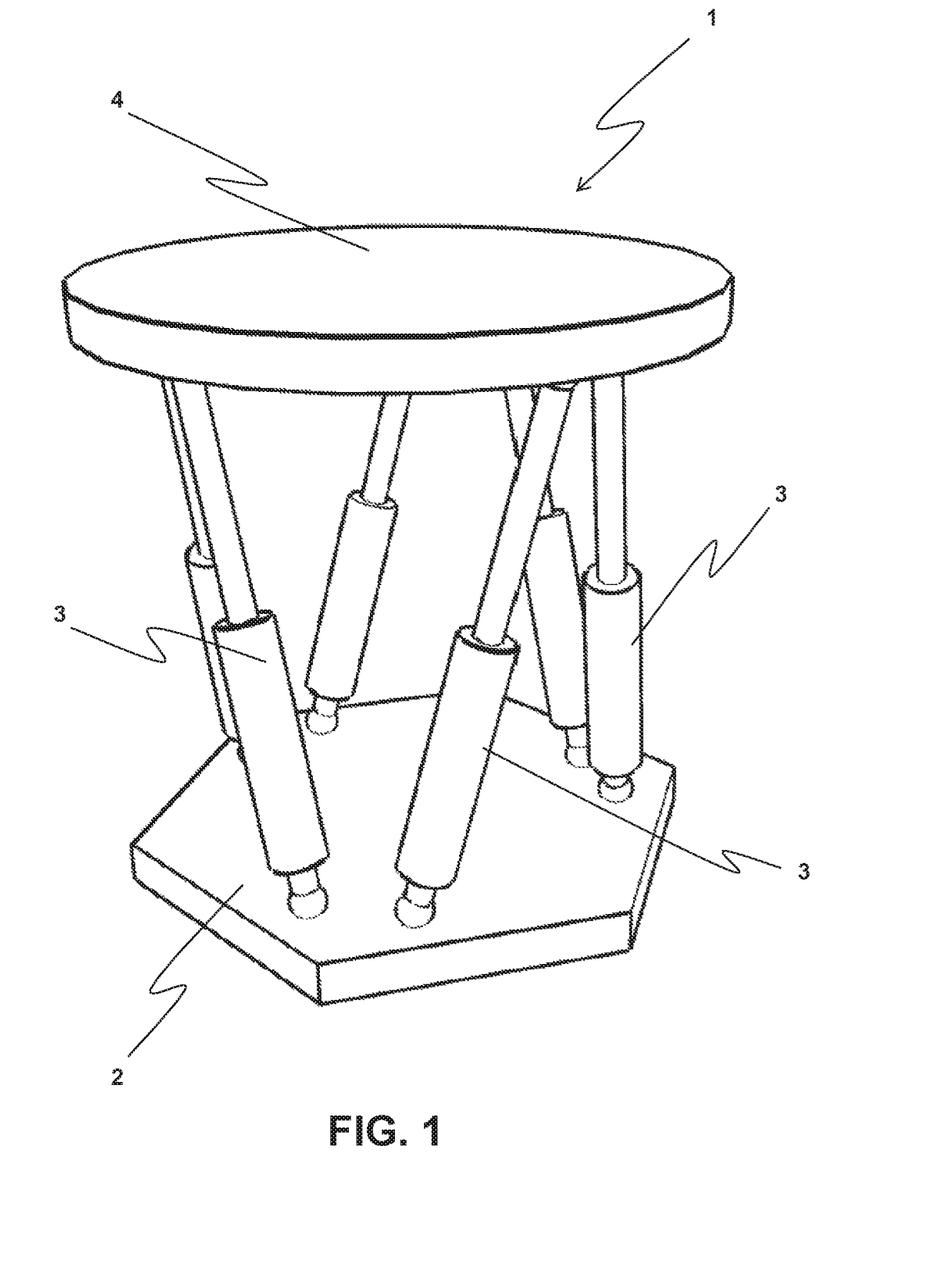
FIG. 1 shows an upper perspective view of a Stewart platform of the previous art in upright position.
Figure 2:
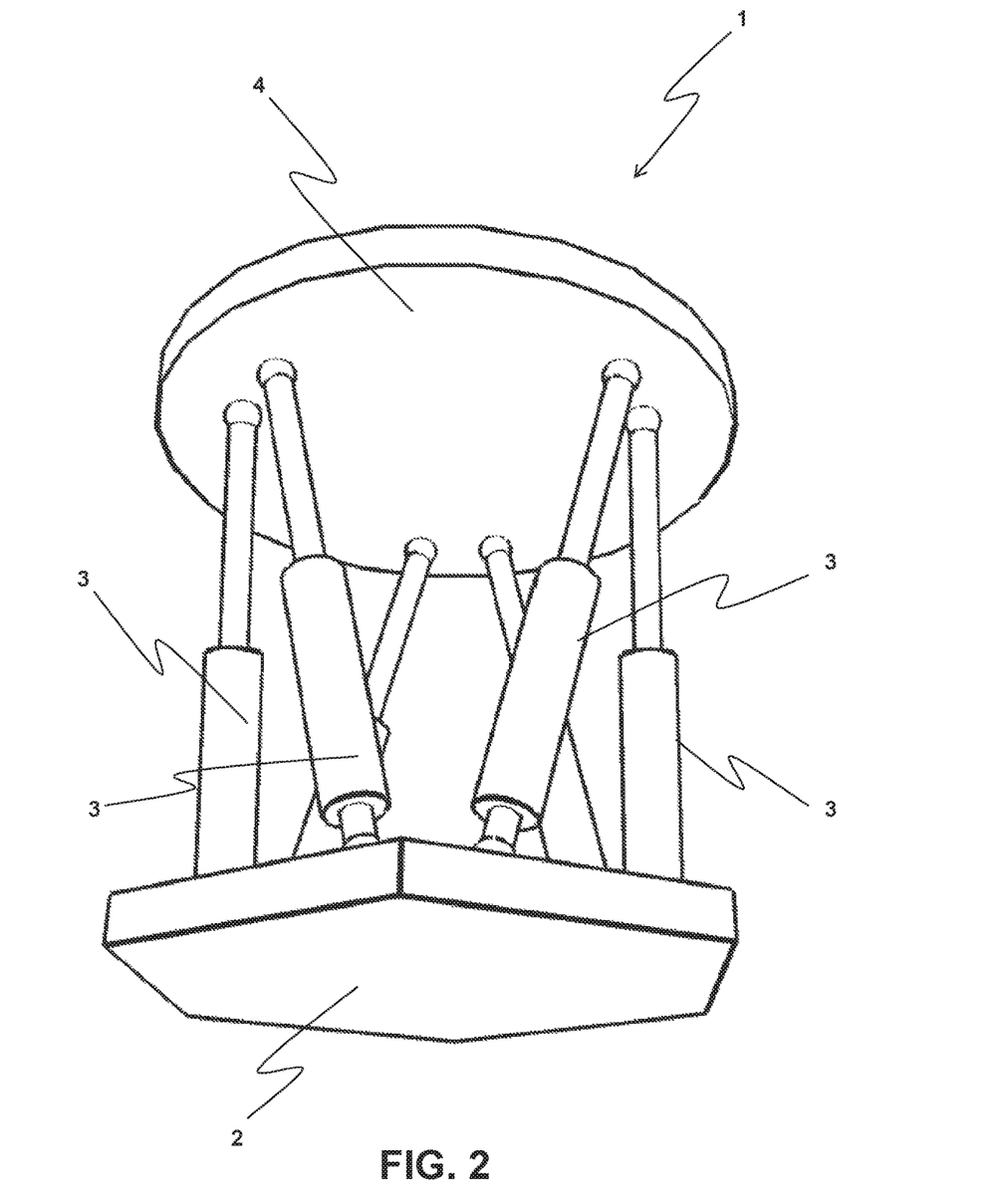
FIG. 2 shows a lower perspective view of a Stewart platform of the previous art in upright position.
Figure 3:
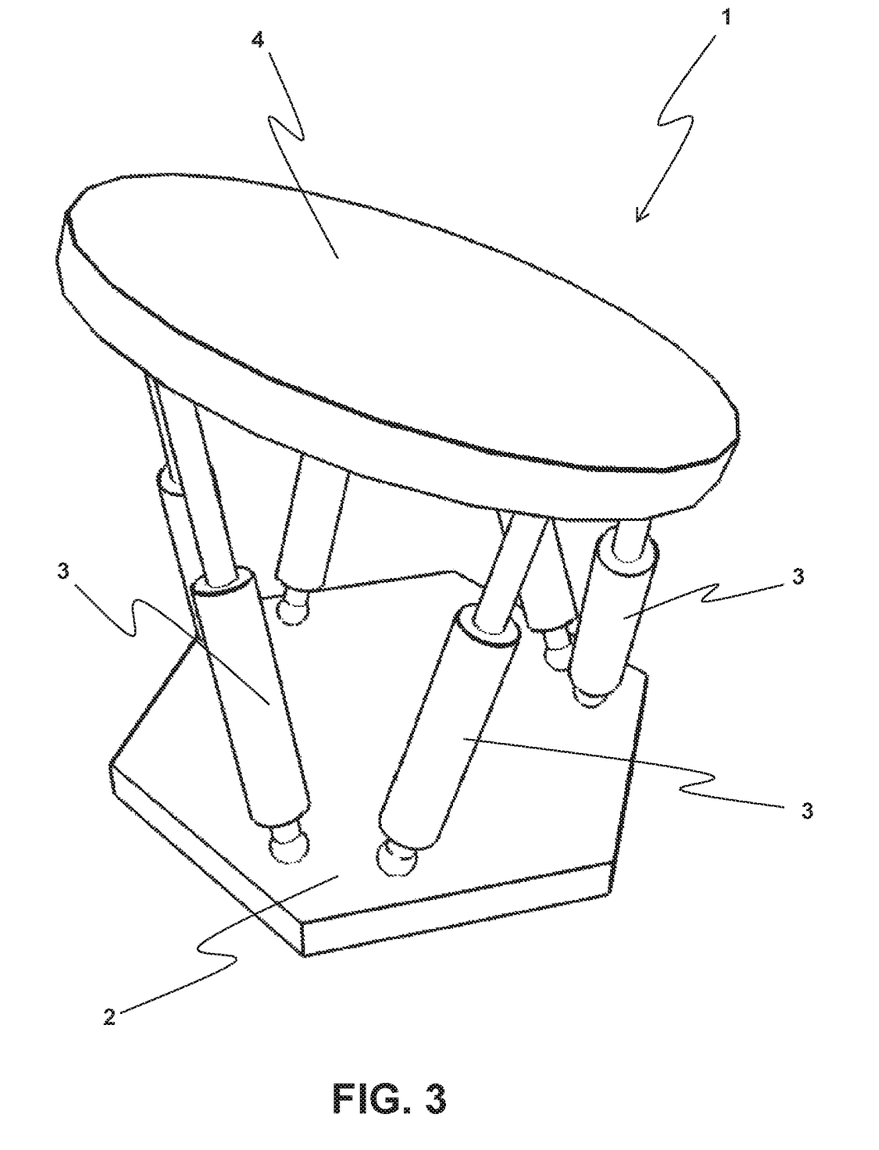
FIG. 3 shows an upper perspective view of a Stewart platform of the previous art in a slanted position.
Figure 4:
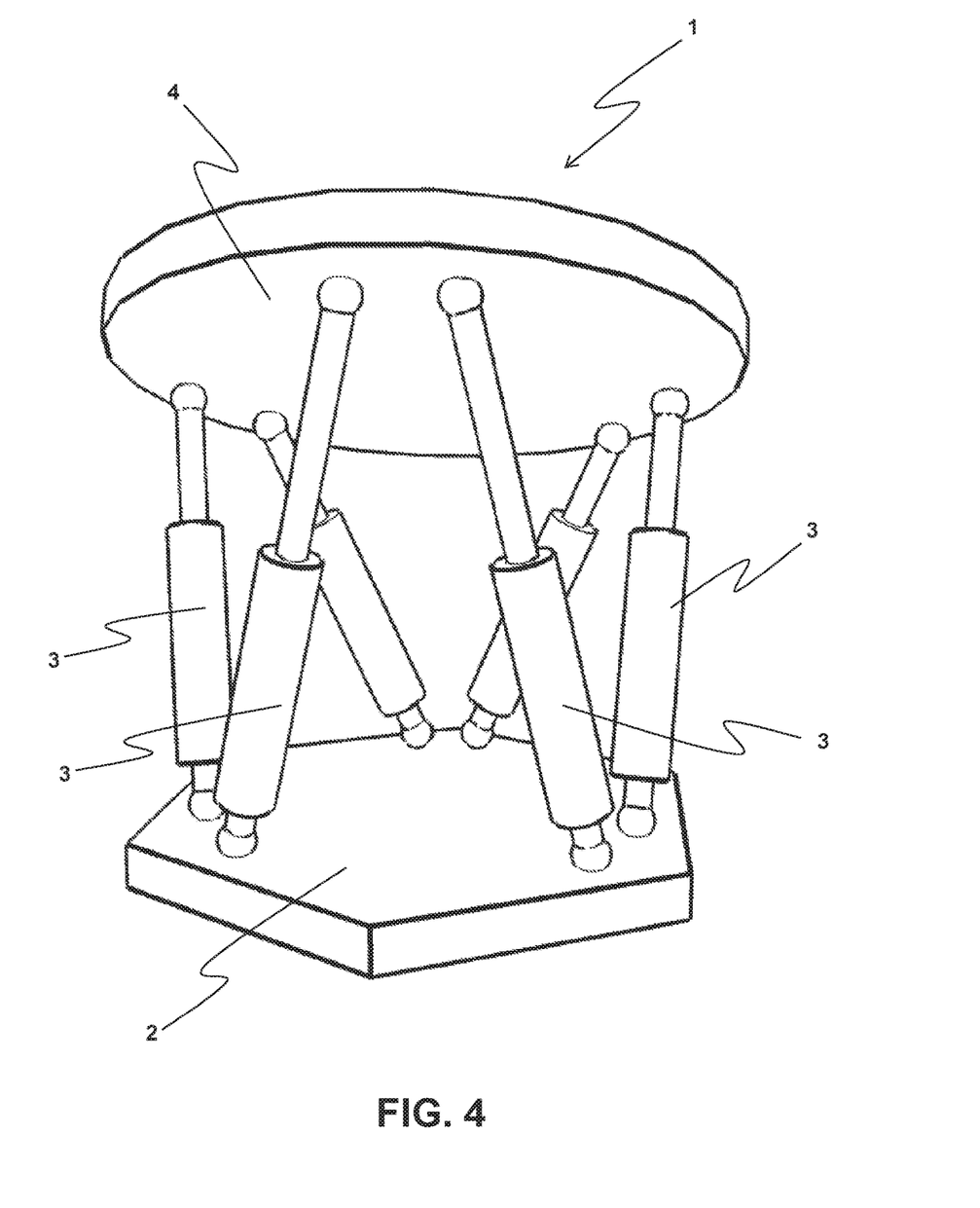
FIG. 4 shows a lower perspective view of a Stewart platform of the previous art in an slanted position.
Figure 5:
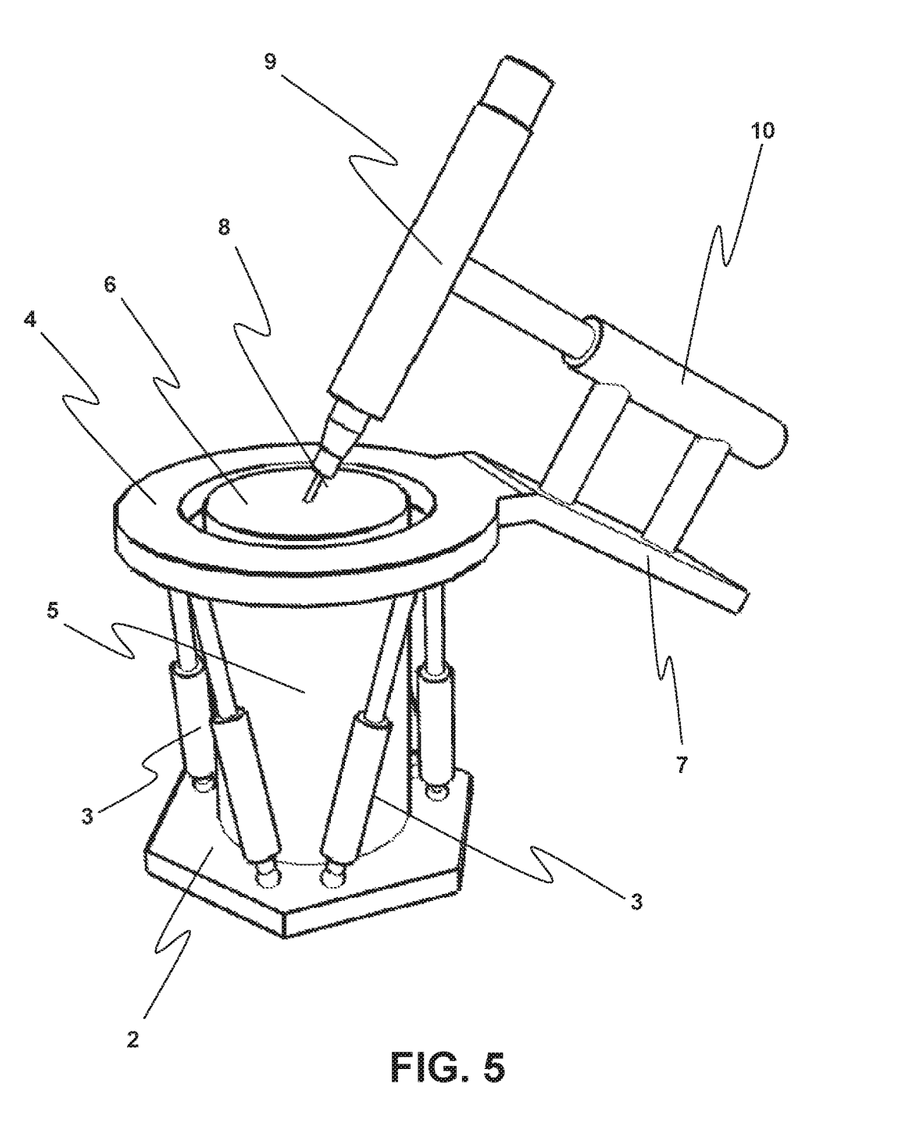
FIG. 5 shows a lower perspective view of a Stewart platform with a welding gun of the present invention.
Figure 6:
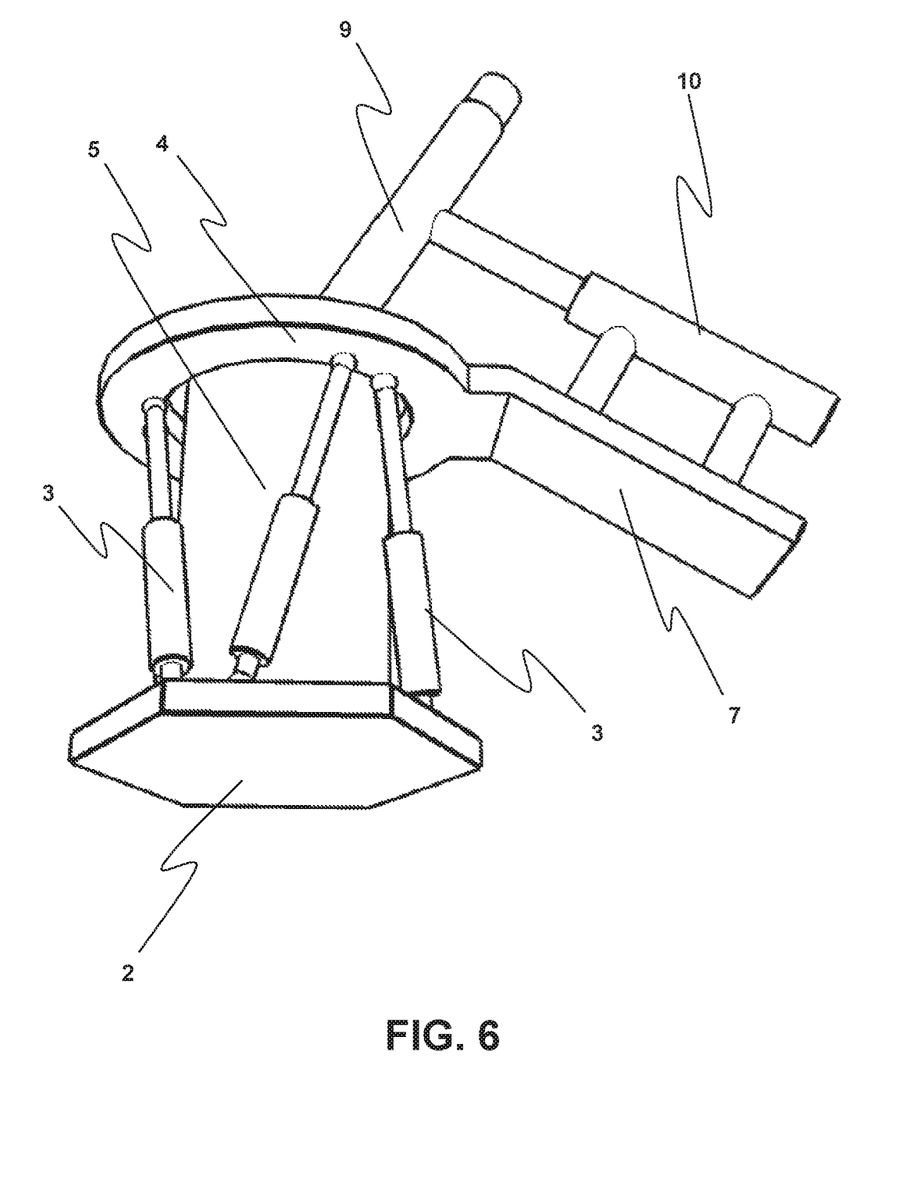
FIG. 6 shows an upper perspective view of a Stewart platform with a welding gun of the present invention.

As shown in FIGS. 5 and 6, the system of the present invention is formed by a Stewart platform (1) from which base (2) a fix bench (5) having a surface (6) emerges, on which surface a plate is mounted (not shown) in order to be welded.

The upper platform (4) comprises an adaptor (7) on which a welding gun (9) having a handle (10) is mounted. On the tip of the gun (9) there is an electrode (8) adjacent to the plate to be welded which is attached to the surface (6).

In order for the system to capture and reproduce the training movements it is necessary that the movements of actuators (3) are correlated with the movement in six degrees of freedom.

Figure 7:
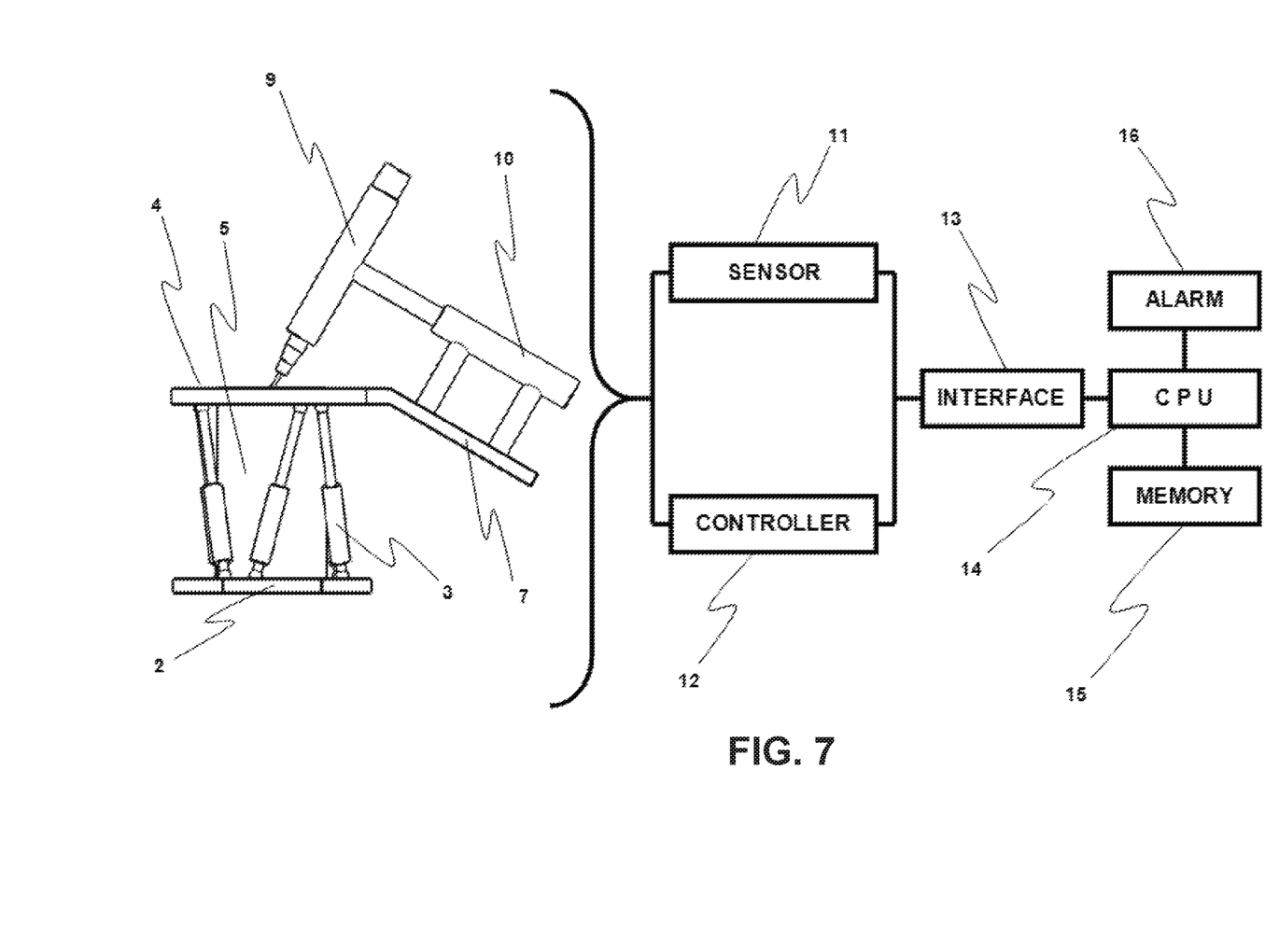
FIG. 7 shows a block diagram of the operation of the system of the present invention.

Thus, according to FIG. 7 when a qualified welder moves the welding gun (9), the movements are transmitted to the actuators (3) which are connected by a sensor (11) which captures the movement and then transmits it to an interface (13) which transforms the movement into a digitalized signal and sends it to the processor (14) wherein the processor (14) stores the data of said digitalized signal in the memory (15). In this way, all the movements made by the qualified welder, captured by the system are then recorded in the memory (15).

When the welder trainee takes the handle (10) of the welding gun (9) the system can reproduce the data of the digitalized signal with the pattern of movements made by the qualified welder, which are stored in the memory (15).

To that end, the data of the movement are obtained by the processor (14) from the memory (15) which sends the information to the interface (13) thereby transforming the digitalized signal into the movement made by the qualified welder and then sends it to a controller (12) which moves the actuators (3) with a movement pattern in six degrees of freedom.

In this condition, the welder trainee can feel on the handle (10) of the gun (9) the patterns of movements which are made by an experienced welder for a determined welding action. This action is transformed into the most efficient learning means, given that the trainee makes the movement in the appropriate way.

On the other hand, the system can be programmed so as a welder trainee can perform a determined welding action, comparing the movement pattern of said action with the movement pattern made by a qualified welder which has been previously recorded in the memory (15) in such a way it emits an alarm (16), for instance, a sound, light or touch alarm when said patterns are different.

To that end, the movement pattern in six degrees of freedom generated by the welder trainee is captured by the sensor (11) and then it is sent to the interface (13) which transforms the movement into a digitalized signal and it is sent to the processor (14) to compare said pattern with the qualified welders pattern which has been previously recorded in the memory (15).

If the movement pattern made by the welder trainee is different from the pattern movement made by the qualified welder, then the processor (14) will emit an alarm (26).

In this condition, the welder trainee can perform movements with the handle (10) of the gun (9) in order to practice the patterns of movement being made by an experienced welder for a determined welding action, thereby improving the learning process.

In order for the system to comply with the objective, that is, capturing the pattern of movement in six degrees of freedom of a qualified welder, the system provides the following steps: (a) detecting through the sensor (11) the pattern of movements made by a qualified welder which are reflected on the actuator (3); (b) transforming said pattern of movements, detected by the sensor (11) into a signal of digitalized data; (c) feeding the interface (13) which transforms the signal of the sensor (11) into digitalized data to be processed by the processor (14); and (d) recording said digitalized data in the memory (15).

In order for the system to comply with the objective, that is, reproducing the pattern of movement in six degrees of freedom of a qualified welder for a welder trainee, the system provides the following steps: (a) discharging from the memory (15) the data digitalized of the pattern of movements made by the qualified welder, by using to this end the processor (14); (b) feeding the interface (13) with a signal of digitalized data; (c) transforming said signal of digitalized data into a pattern of movements; and (d) sending through the sensor (11) the pattern of movements made by a qualified welder towards the actuators (3).

In order for the system to comply with the objective, that is, that the welder trainee can practice a pattern of movement in six degrees of freedom being previously made by a qualified welder, the system provides the following steps; (a) detecting through the sensor (11) the pattern of movements made by the welder trainee; (b) transforming said pattern of movements, detected by the sensor (11) into a signal of digitalized data; (c) feeding the interface (13) which transforms the signal of the sensor (11) into digitalized data to be processed by the processor (14); (d) comparing said digitalized data of the pattern of movement made by the welder trainee with the digitalized data of the pattern of movement made by the qualified welder which are stored in the memory (15); and (e) in the case that said data are different, an alarm (16) should be emitted.

The aforementioned automatized system also has the advantage that can have a list of welding actions with different patterns made by a qualified welder so as they can be reproduced for a welder trainee.

The invention claimed is:

1. A system for teaching how to weld which allows training of welder trainees from qualified experienced welders comprising:
a base (2);
an upper platform (4) positioned above said base (2);
six actuators (3) extending between and connected to said base (2) and said upper platform (4) to allow said upper platform (4) to be moved in six degrees of freedom;
a fixed bench (5) positioned above said base (2), said fixed bench (5) having a surface (6) on which a plate to be welded is mounted, said upper platform (4) defining an opening for access to the surface (6) on which the plate to be welded is mounted;

an adaptor (7) connected to said upper platform (4);

a welding gun (9) having a handle (10) connected to said adaptor (7), said welding gun (9) having a tip with an electrode (8) positioned adjacent to the plate to be welded, said plate being attached to the surface (6) of said fixed bench (5);

a sensor (11) and a controller (12) connected to said actuators (3);

an interface (13) connected to said sensor (11) and said controller (12); and a processor (14) connected to said interface (13), said processor (14) having a memory (15) and an alarm (16).

2. A method of using the system of claim 1, comprising:

providing the system of claim 1 for teaching how to weld which allows training of welder trainees from qualified experienced welders;

transmitting a pattern of movements to the actuators (3) when the qualified experienced welders move the welding gun (9);

detecting and capturing the pattern of movements made by the qualified experienced welders with the sensor (11);

transmitting the pattern of movements made by the qualified experienced welders from the sensor (11) to the interface (13)

transforming the pattern of movements made by the qualified experienced welders into a signal of digitalized data of the pattern of movements made by the qualified experienced welders in the interface (13);

sending and transmitting the signal of digitalized data of the pattern of movements made by the qualified expensed welders from the interface (13) to the processor (14);

processing the signal of digitalized data of the pattern of movements made by the qualified experienced welders in the processor (14); and recording and storing said digitalized data of the pattern of movements made by the qualified experienced welders in the memory (15).

3. A method of using the system of claim 2, comprising:

retrieving from the memory (15) the digitalized data of the pattern of movements made by the qualified experienced welders;

feeding the retrieved digitalized data of the pattern of movements made by the qualified experienced welders to the interface (13);

transforming the retrieved digitalized data of the pattern of movements made by the qualified experienced welders to a signal of retrieved digitalized data in the interface (13); and sending the signal of retrieved digitalized data of the pattern of movements made by the qualified experienced welders from the interface (13) to the controller (12) to move the actuators (3) in a movement pattern corresponding to the pattern of movements made by the qualified experienced welders.

4. A method of using the system of claim 2, comprising:

transmitting a trainee pattern of movements to the actuators (3) when the welder trainees move the welding gun (9);

detecting the trainee pattern of movements made by the welder trainees with the sensor (11);

transmitting the trainee pattern of movements made by the welder trainees from the sensor (11) to the interface (13)

transforming the trainee pattern of movements made by the welder trainees into a trainee signal of digitalized data of the trainee pattern of movements made by the welder trainees in the interface (13);

processing the trainee signal of digitalized data of the trainee pattern of movements made by the welder trainees in the processor (14);

comparing in the processor the digitalized data of the trainee pattern of movements made by the welder trainee with the stored digitalized data of the pattern of movement made by the qualified experienced welders which are stored in the memory (15); and emitting an alarm signal from the alarm (16) when the compared digitalized data are different.

5. A system according to claim 1 wherein said alarm is a sound alarm.

6. A system according to claim 1 wherein said alarm is a light alarm.

7. A system according to claim 1 wherein said alarm is a touch alarm.

8. A method of using the system of claim 3, including reproducing the pattern of movements made by the qualified experienced welders on the handle (10) of the welding gun (9) so that when the welder trainee grips the handle (10) of the welding gun (9) the welder trainee can feel the movement pattern corresponding to the pattern of movements made by the qualified experienced welders when the actuators (3) are moved in response to the signal of retrieved digitalized data of the pattern of movements made by the qualified experienced welders sent from the interface (13) to the controller (12).

* * * * *